US011468351B1

(12) United States Patent
Choma et al.

(10) Patent No.: US 11,468,351 B1
(45) Date of Patent: Oct. 11, 2022

(54) PREDICTING TEXT BY RECONSTRUCTING NEUROIMAGING SIGNALS

(71) Applicant: Meta Platforms, Inc., Menlo Park, CA (US)

(72) Inventors: Michael Andrew Choma, Menlo Park, CA (US); Emily Mittag Mugler, Redwood City, CA (US); Patrick Mineault, San Francisco, CA (US); Soo Yeon Kim Jennings, Sunnyvale, CA (US); Mark Allan Chevillet, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 805 days.

(21) Appl. No.: 16/425,919

(22) Filed: May 29, 2019

Related U.S. Application Data (60) Provisional application No. 62/678,181, filed on May 30, 2018.

(51) Int. Cl.
| | | |
|---|---|---|
| *G06N 5/04* | (2006.01) | |
| *G06N 3/08* | (2006.01) | |
| *G06F 3/01* | (2006.01) | |
| *G06N 20/20* | (2019.01) | |
| *G06N 3/04* | (2006.01) | |
| *G06F 40/40* | (2020.01) | |

(52) U.S. Cl.
CPC .............. *G06N 5/046* (2013.01); *G06F 3/015* (2013.01); *G06F 40/40* (2020.01); *G06N 3/0454* (2013.01); *G06N 3/084* (2013.01); *G06N 20/20* (2019.01)

(58) Field of Classification Search
CPC ...... G06N 5/046; G06N 20/20; G06N 3/0454; G06N 3/084; G06F 40/40; G06F 3/015
See application file for complete search history.

(56) References Cited

PUBLICATIONS

Pereira et al., "Generating Text from Functional Brain Images," Frontiers in Human Neuroscience, vol. 5, 2011, DOI=10.3389/fnhum.2011.00072 (Year: 2011).*

(Continued)

*Primary Examiner* — Michelle M Koeth
(74) *Attorney, Agent, or Firm* — Fenwick & West LLP (57) ABSTRACT

A brain computer interface (BCI) system predicts text based on input and output signals obtained in relation to an individual that are informative for determining an individual's neurobiological activity. The BCI system applies a first predictive model to the input signal and a second predictive model to the output signal. The first predictive model predicts the forward propagation of the input signal through the individual's head whereas the second predictive model predicts the backward propagation of the output signal through the individual's head. Each of the first predictive model and second predictive model predicts characteristics of their respective signal at a common plane such as the cortical surface of the individual's brain. The BCI system predicts text by applying a third predictive model to the predicted signal characteristics at the common plane outputted by the first predictive model and the second predictive model.

19 Claims, 9 Drawing Sheets

(56) References Cited

PUBLICATIONS

Trakoolwilaiwan et al.,"Convolutional neural network for high-accuracy functional near-infrared spectroscopy in a brain-computer interface: three-class classification of rest, right-, and left-hand motor execution." Neurophotonics vol. 5,1 (2018): 011008. doi: 10.1117/1.NPh.5.1.011008 (Year: 2018).*

Nilsson et. al, "Semantic Video Segmentation by Gated Recurrent Flow Propagation," arXiv:1612.08871v2 [cs.CV], Oct. 2, 2017, https://doi.org/10.48550/arXiv.1612.08871 (Year: 2017).*

He et al., "Deep Learning for Image-to-Text Generation: A Technical Overview," in IEEE Signal Processing Magazine, vol. 34, No. 6, pp. 109-116, Nov. 2017, doi: 10.1109/MSP.2017.2741510 (Year: 2017).*

Manor et al., "Convolutional Neural Network for Multi-Category Rapid Serial Visual Presentation BCI," Frontiers in Computational Neuroscience, Dec. 2015, vol. 9, Article 146, doi: 10.3389/fncom.2015.00146 (Year: 2015).*

Dupont et al., "Label-Dependencies Aware Recurrent Neural Networks," Intelligent Text Processing and Computational Linguistics (CICIing), Apr. 2017, Budapest, Hungary. hal-01579097 (Year: 2017).*

* cited by examiner

Receive a set of neuroimaging signals obtained from an individual, the set including input signals and output signals
710

Determine characteristics of the input signals and output signals
720

Apply a forward model to the characteristics of the input signals to obtain forward plane features
730

Apply characteristics of the output signals as input to a backward model to obtain backward plane features
740

Determine text features by comparing predicted forward plane features and predicted backward plane features
750

Apply text features as input to a text model to obtain predicted text
760

PREDICTING TEXT BY RECONSTRUCTING NEUROIMAGING SIGNALS

CROSS REFERENCE TO RELATED APPLICATIONS

This application claims the benefit of U.S. Provisional Application Ser. No. 62/678,181 filed 30 May 2018, which is incorporated in its entirety herein by this reference.

BACKGROUND

This disclosure generally relates to unspoken communications, and more specifically to predicting text from neuroimaging signals obtained from an individual that are informative for determining an individual's neurobiological activity.

Communication via physical actions, such as textual entry or manipulation of a user interface on a mobile or other device is a key form of interaction amongst individuals today. For example, certain online systems, such as online social networks, thrive on the network of users that frequent the online social network on a consistent basis. One component of online social networks is the ability of a user to communicate with others on the online social network by providing comments, content, feedback, and the like to other users of the online social network. In many scenarios, communicating with others on online systems, such as an online social network, requires the user to type or enter words and phrases through a physical means (e.g., a keyboard or clicking on a virtual keyboard). Physically entering words and phrases for communication purposes may be cumbersome or impossible for certain individuals (e.g., quadriplegics or those that have suffered injuries to their extremities). As such, online social networks have difficulty engaging users that may be interested in using the online social network, but are unable to do so due to the difficulty in communicating with others in the online social network. And more generally, physical entry of words and phrases for all individuals is often an inefficient way to communicate as typing or otherwise manipulating various user interfaces can be cumbersome.

Conventional strategies to enable communications in online systems, such as social networks, without the need for physically entering words include voice-to-text options, which can adequately interpret spoken words and phrases and translate them into text. However, voice-to-text options are often inaccurate and face significant privacy concerns. For example, users may prefer not to use voice-to-text in public settings where their personal conversations may be readily overheard. As such, conventional strategies for enabling communications in the online social network do not necessarily meet all of the needs of users.

SUMMARY

A brain computer interface (BCI) system obtains a set of neuroimaging signals that is informative for determining an individual's neurobiological activity. The BCI system analyzes the set of neuroimaging signals to predict text that the individual is thinking. In various embodiments, the BCI system applies multiple trained predictive models to analyze the set of neuroimaging signals. By predicting text that the individual is thinking, the BCI system enables unspoken communications and can provide the predicted text on behalf of the individual to communicate with others.

In various embodiments, the set of neuroimaging signals includes input illumination signals that are provided to the individual's head and output signals that are captured after passing through the individual's head. Input illumination signals can be provided by sources whereas output signals can be captured by detectors. Each of the sources and the detectors can be positioned at varying locations around the individual's head for imaging various locations of the individual's brain. As an example, the BCI system can employ optical sources and optical detectors that are positioned in contact with the individual's head for performing optical tomography. Therefore, the set of neuroimaging signals includes input optical signals and output optical signals.

The BCI system determines characteristics of input illumination signals and output signals and applies the determined characteristics of input illumination signals and the determined characteristics of output signals as input into separate predictive models. Specifically, the BCI system applies a forward model to characteristics of input illumination signals and applies a backward model to characteristics of output signals. The forward model is structured to predict the forward propagation of input illumination signals as they traverse through an individual's head. In other words, the forward model predicts characteristics of output signals given the characteristics of input illumination signals. Conversely, the backward model is structured to predict the backward propagation of output signals. In other words, the backward model predicts characteristics of input illumination signals given the characteristics of output signals.

An intermediate step within each of the forward model and backward model predicts characteristics of signals at a plane within the individual's head. In one embodiment, the plane corresponds to the cortical surface of the individual's brain. Here, the predicted characteristics of signals at the cortical surface are informative of the neurobiological activity at the cortical surface. The BCI system analyzes the characteristics of signals at the plane predicted by the forward model and the characteristics of signals at the plane predicted by the backward model by applying a text model. The text model is structured to predict text based on the characteristics of signals at the plane predicted by both the forward model and the backward model.

Altogether, the BCI system predicts text using the forward model, backward model, and text model based on the set of the neuroimaging signals obtained from the individual's head. In particular, this method of predicting text using the neuroimaging signals does not require explicitly understanding or identifying the underlying neurobiological activity; rather, the forward model, backward model, and text model are trained to incorporate the effects of the underlying neurobiological activity when predicting text. This approach is particularly useful in complex biological environments such as neurological microenvironments where various cellular and non-cellular processes may be occurring simultaneously.

The BCI system can provide the predicted text to communicate on behalf of the individual. As an example, the BCI system can communicate with the individual's friends, such as friends of the individual in a social networking system.

The figures depict various embodiments for purposes of illustration only. One skilled in the art will readily recognize from the following discussion that alternative embodiments of the structures and methods illustrated herein may be employed without departing from the principles of the invention described herein.

Reference will now be made in detail to several embodiments, examples of which are illustrated in the accompanying figures. It is noted that similar or like reference numbers may be used in the figures and may indicate similar or like functionality. For example, a letter after a reference numeral, such as "150A," indicates that the text refers specifically to the element having that particular reference numeral. A reference numeral in the text without a following letter, such as "150," refers to any or all of the elements in the figures bearing that reference numeral (e.g. "computing device 150" in the text refers to reference numerals "computing device 150A" and/or "computing device 150B" in the figures).

DETAILED DESCRIPTION

Brain Computer Interface System

Figure 1:
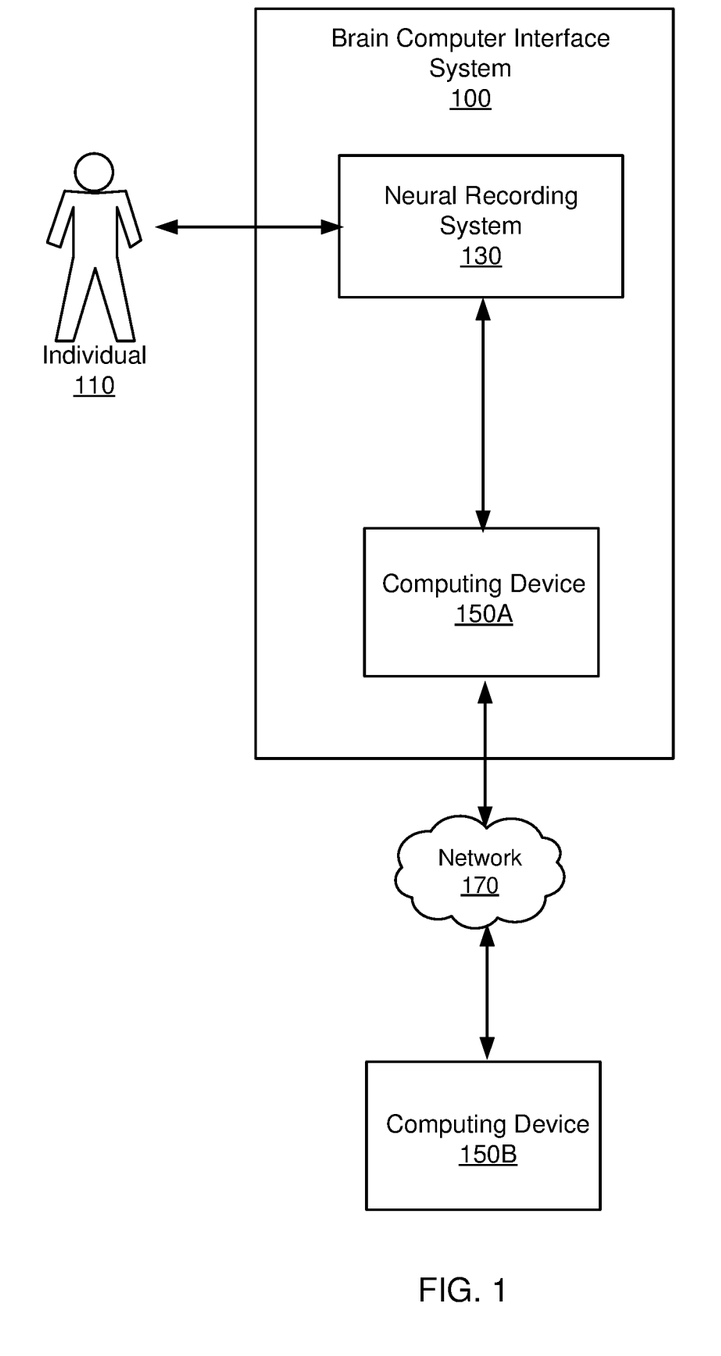
FIG. 1 depicts a BCI system for enabling unspoken communications by an individual, in accordance with an embodiment.

FIG. 1 depicts a brain computer interface (BCI) system 100 for enabling unspoken communications by an individual 110, in accordance with an embodiment. As used hereafter, unspoken methods and/or unspoken communications refer to communications that can be performed by an individual through non-verbal (e.g., without verbal sounds), non-physical (e.g., not inputted by an individual through a physical means such as a keyboard, mouse, touchscreen, and the like), and non-expressive (e.g., not expressed through facial features, body language, and the like) means. The BCI system 100 may include a neural recording system 130 and a computing device 150. The computing device 150 may be interconnected with one or more additional computing devices 150B through a network 170.

Generally, the neural recording system 130 obtains a set of neuroimaging signals from the individual 110 that can be informative for determining the individual's neurobiological activity. In various embodiments, a set of neuroimaging signals includes input illumination signals provided to the individual's head and output signals that are derived from input illumination signals after passing through a portion of the individual's head. As one example, the neural recording system 130 employs optical imaging techniques. Therefore, input illumination signals can be light signals provided to the individual's head and output signals can be light signals captured after propagating through a portion of the individual's head.

Figure 2:
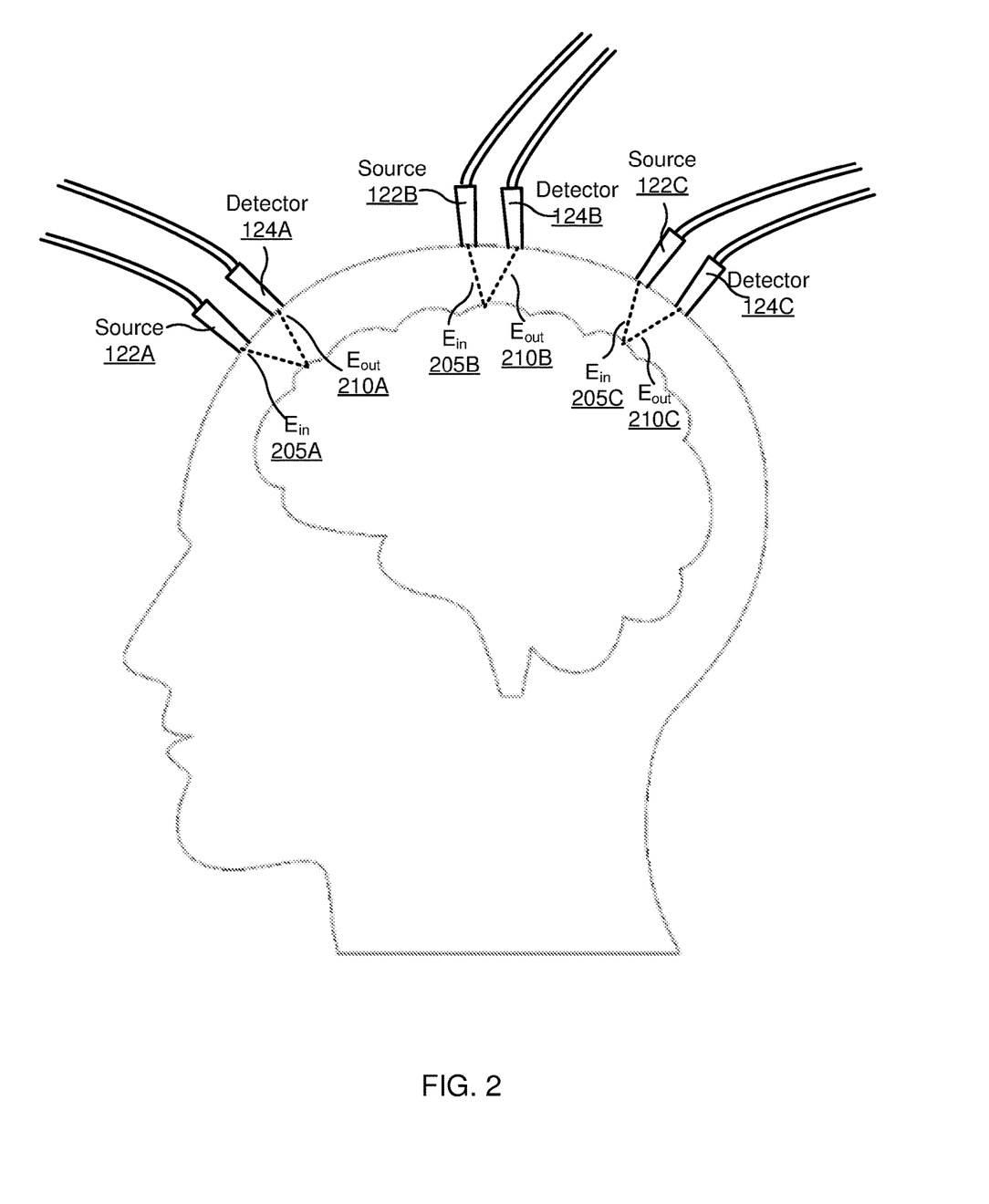
FIG. 2 depicts example components of the neural recording system for capturing a set of neuroimaging signals from an individual, in accordance with an embodiment.

FIG. 2 depicts example components of the neural recording system 130 for capturing a set of neuroimaging signals from an individual, in accordance with an embodiment. Here, the components of the neural recording system 130 are configured to enable functional neuroimaging of the individual's brain. In such embodiments, the neural recording system 130 can include one or more sources 122 and one or more detectors 124. Although FIG. 2 depicts three sources 122 and three detectors 124, in some embodiments, the neural recording system 130 can include additional (e.g., tens, hundreds, or thousands) of sources 122 and detectors 124. Additionally, although FIG. 2 depicts one particular positioning of sources 122 and detectors 124, in other embodiments, the sources 122 and detectors 124 can be differently positioned.

In various embodiments, each optical source 122 is paired with a corresponding optical detector 124. For example, source 122A is paired with detector 124A, source 122B is paired with detector 124B, and source 122C is paired with detector 124C. Each source 122 provides an input illumination signal (e.g., $E_{in}$ 205A, 205B, or 205C) which propagates through the individual's head. The signal can propagate through a location of the individual's brain and subsequently can be captured by a detector 124. Each detector 124 captures an output signal (e.g., $E_{out}$ 210A, 210B, or 210C). FIG. 2 depicts one embodiment where each source 122 and detector 124 pair is independent from another source 122 and detector 124 pair. In some embodiments, the sources 122 and detectors 124 are positioned such that a detector 124 can capture an output signal (e.g., $E_{out}$) that is derived from an input illumination signal (e.g., $E_{in}$) provided by more than one source 122.

The neural recording system 130 obtains the set of neuroimaging signals through the sources 122 and the detectors 124. In various embodiments, the set of neuroimaging signals includes input illumination signals and output signals corresponding to a particular timepoint. For example, the set of neuroimaging signals includes input illumination signals provided by one or more sources 122 that are turned on at the particular timepoint. Additionally, the set of neuroimaging signals includes output signals captured by the detectors 124, where the output signals derive from the input illumination signals provided by the sources 122 at the particular timepoint. As shown in FIG. 2, source 122A, source 122B, and source 122C can each be turned on and provide input illumination signals $E_{in}$ 205A, $E_{in}$ 205B, and $E_{in}$ 205C, respectively. Here, the set of neuroimaging signals includes each of $E_{in}$ 205A, $E_{in}$ 205B, and $E_{in}$ 205C. The detectors 124 capture output signals $E_{out}$ 210A, $E_{out}$ 210B, and $E_{out}$ 210C. Here, the set of neuroimaging signals includes each of $E_{out}$ 210A, $E_{out}$ 210B, and $E_{out}$ 210C.

In other embodiments, the neural recording system 130 captures a set of input illumination signals and output signals using other techniques such as any one of functional magnetic resonance imaging (fMRI), blood-oxygen-level dependent (BOLD) contrast imaging, near-infrared spectroscopy (NIRS), magnetoencephalography (MEG), electrocorticography (ECoG), electroencephalography (EEG), positron emission tomography, nuclear magnetic resonance (NMR) spectroscopy, single-photon emission computed tomography.

The neural recording system 130 can be communicatively coupled with the computing device 150A. The neural recording system 130 can receive inputs from the computing device 150A. For example, the neural recording system 130 receives instructions (e.g., turn on, turn off, start recording, stop recording) from the computing device 150A. Referring again to FIG. 2, the computing device 150A can provide instructions for turning on and turning off sources 122. This enables each detector 124 (e.g., detectors 124A, 124B, and 124C) to capture output signals that derive from input illumination signals provided by sources 122 that are turned on without interference from other sources 122 that are turned off. For example, the computing device 150A can provide an instruction to turn on source 122A while keeping sources 122B and sources 122C off. Therefore, the output signal captured by each of detector 124A, detector 124B, and detector 124C is derived from a signal that is provided by source 122A.

In various embodiments, the computing device 150A provides an instruction for turning on and turning off sources 122 in a particular sequence. For example, the computing device 150A can instruct the neural recording system 130 to turn on source 122A while keeping sources 122B and 122C off, then to turn on source 122B while keeping sources 122A and 122C off, then to turn on source 122C while keeping sources 122A and 122B off. Therefore, the detectors 124 can sequentially capture output signals that solely derive from signals provided by source 122A, source 122B, and source 122C.

The neural recording system 130 provides the set of neuroimaging signals to the computing device 150A. The computing device 150A uses the set of neuroimaging signals for predicting text to enable unspoken communications for an individual. Generally, the computing device 150A employs predictive models to predict text. The subsequent description refers to processes performed by the computing device 150A (or modules of the computing device 150A) during one of a training phase or a deployment phase. As used hereafter, the training phrase refers to the training of one or more predictive models using the set of neuroimaging signals provided by the neural recording system 130. The deployment phase refers to the application of one or more predictive models to predict text based on the set of neuroimaging signals provided by the neural recording system 130.

In some embodiments, a computing device 150A enables an individual to access an online social networking system, and therefore, enables the individual to communicate with other users of the online social networking system through unspoken methods. For example, the computing device 150A can predict an unspoken word for the individual and transmits the predicted unspoken word to another user of the online social networking system. As shown in FIG. 1, a computing device 150A can be communicatively coupled to other computing devices (e.g., computing device 150B) through a network 170 and therefore, can communicate on behalf of the individual via unspoken methods.

In other embodiments, the computing device 150A enables users to perform other functions based on the predicted text. For example, the computing device 150A may predict the text "turn off the alarm" or "what's the weather" based on a set of neuroimaging signals and perform a corresponding action such as turning off a current alarm or provide a forecast of the weather for the next 24 hours.

A computing device 150 (e.g., computing device 150A and/or computing device 150B) can be one of a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the computing device 150 can be any device having computer functionality, such as a personal digital assistant (PDA), mobile telephone, smartphone, etc. An example computing device 150 is described below in reference to FIG. 8. The computing device 150 may execute instructions (e.g., computer code) stored on a computer-readable storage medium in order to perform the steps and processes described herein for enabling unspoken communications by an individual 110.

The network 170 facilitates communications between the one or more computing devices 150. The network 170 may be any wired or wireless local area network (LAN) and/or wide area network (WAN), such as an intranet, an extranet, or the Internet. In various embodiments, the network 170 uses standard communication technologies and/or protocols. Examples of technologies used by the network 170 include Ethernet, 802.11, 3G, 4G, 802.16, or any other suitable communication technology. The network 170 may use wireless, wired, or a combination of wireless and wired communication technologies. Examples of protocols used by the network 170 include transmission control protocol/Internet protocol (TCP/IP), hypertext transport protocol (HTTP), simple mail transfer protocol (SMTP), file transfer protocol (TCP), or any other suitable communication protocol.

Methods for Predicting Words from Captured Neuroimaging Signals

Figure 3:
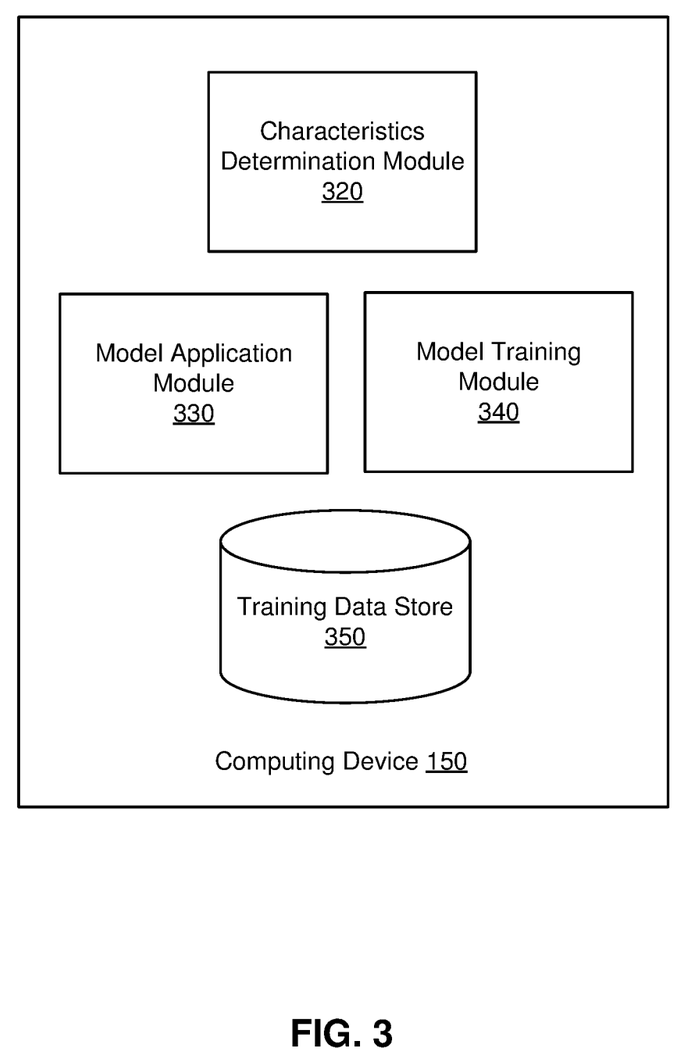
FIG. 3 is a block diagram of an example computing device used to predict text from a set of neuroimaging signals, in accordance with an embodiment.

FIG. 3 is a block diagram of an example computing device 150 used to predict text from a set of neuroimaging signals, in accordance with an embodiment. The computing device 150 may include a characteristics determination module 320, a model application module 330, a model training module 340, and a training data store 350.

Determining Signal Characteristics

The characteristics determination module 320 receives the set of neuroimaging signals provided by the neural recording system 130 and determines characteristics of the set of neuroimaging signals (e.g., input illumination signals and output signals). As used hereafter, characteristics of input illumination signals are referred to as $E_{in}$ characteristics, and the characteristics of output signals are referred to as $E_{out}$ characteristics. During deployment, the characteristics determination module 320 provides $E_{in}$ characteristics and $E_{out}$ characteristics to the model application module 330. During training, the characteristics determination module 320 stores the $E_{in}$ characteristics and $E_{out}$ characteristics as training examples in the training data store 350.

Example characteristics of a signal include a power of the signal, an intensity of the signal, a frequency of the signal, and the like. The characteristics determination module 320 can determine characteristics of a signal across an interval of the signal. For example, the characteristics determination module 320 can determine characteristics for a range (e.g., a time range or a frequency range) of a signal. In one embodiment, the characteristics determination module 320 determines characteristics of a signal across different ranges of a signal by applying a sliding window across the signal.

Generally, the model application module 330 applies predictive models to predict unspoken text based on the characteristics of a signal (e.g., $E_{in}$ characteristics and $E_{out}$ characteristics). In one embodiment, the model application module 330 applies the $E_{in}$ characteristics as input to a first predictive model, hereafter referred to as a forward model, and further applies the $E_{out}$ characteristics as input to a second predictive model, hereafter referred to as a backward model. The model application module 330 analyzes the outputs of the forward model and the backward model and provides the analyzed outputs as input to a third predictive model, hereafter referred to as a text model. The model application module 330 is described in further detail below in relation to FIG. 4.

The model training module 340 trains one or more predictive models using training examples from the training data store 350. Training examples can be obtained through empirical data gathering methods. In various embodiments, each training example includes characteristics of signals. For example, a training example can include input illumination signal characteristics (e.g., $E_{in}$ characteristics) determined from emitted signals from sources (e.g., sources 122 in FIG. 2) and output signal characteristics (e.g., $E_{out}$ characteristics) derived from signals captured by detectors (e.g., detectors 124 in FIG. 2). In some embodiments, a training example further includes labeled text that corresponds to the $E_{in}$ characteristics and $E_{out}$ characteristics of the training example. For example, labeled text in a training example can be one or more words, phrases, or sentences that an individual was thinking when signals were emitted from sources 122 and captured by detectors 124. The methods performed by the model training module 340 for training one or more predictive models is described below in relation to FIG. 6.

Deployment of Predictive Models for Predicting Text

Figure 4:
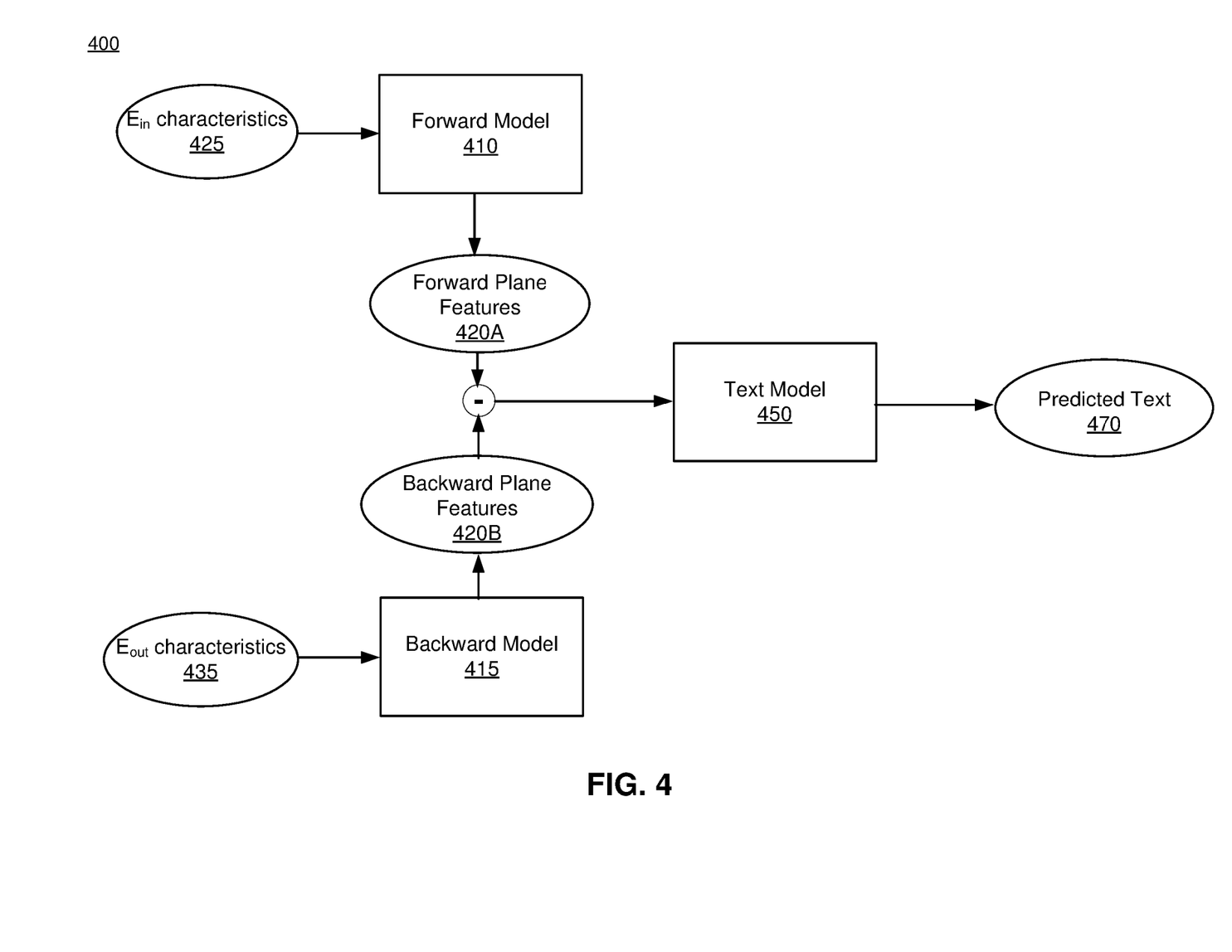
FIG. 4 depicts a block diagram flow process for predicting text using neuroimaging signals during deployment, in accordance with an embodiment.

FIG. 4 depicts a block diagram flow process 400 for predicting text using neuroimaging signals during deployment, in accordance with an embodiment. Generally, FIG. 4 depicts the process performed by the model application module 330.

The model application module 330 receives $E_{in}$ characteristics 425 and $E_{out}$ characteristics 435 from the characteristics determination module 320 and applies them as input into separate predictive models. As shown in FIG. 4, the model application module 330 applies $E_{in}$ characteristics 425 as input to a forward model 410 and applies $E_{out}$ characteristics 435 as input to a backward model 415. Generally, the forward model 410 models the forward propagation of a signal over time and space as the signal travels from a source (e.g., a source 122 shown in FIG. 2) to a detector (e.g., a detector 124 shown in FIG. 2). Additionally, the backward model 415 models the backward propagation of the signal from a detector (e.g., a detector 124 shown in FIG. 2) to a source (e.g., a source 122 shown in FIG. 2). The structure of each of the forward model 410 and backward model 415 are described in further detail below in relation to FIGS. 5A and 5B, respectively.

The forward model 410 outputs a prediction of forward plane features 420A whereas the backward model 415 outputs a prediction of backward plane features 420B. The forward plane features 420A and the backward plane features 420 describe characteristics of a plane. In various embodiments, the plane represents a plane of the individual's brain, such as the cortical surface of the individual's brain. Examples of forward plane features 420A and backward plane features 420B can include signal features at the common plane. Signal features include one or more of the intensity of a signal, the amount of absorption of a signal, the polarization of a signal, angular momentum of a signal, and the like. Additionally, examples of forward plane features 420A and backward plane features 420B can include biological characteristics at the plane including motion derived from blood flow, cellular motion (e.g., cellular shrinking, swelling or quasi-diffusive motion), cellular polarization, and the like.

The model application module 330 derives text features using forward plane features 420A and backward plane features 420B and applies the text features as input to the text model 450. In one embodiment, the model application module 330 uses the forward plane features 420A and the backward plane features 420B as text features. In one embodiment, the model application module 330 derives text features from the forward plane features 420A and the backward plane features 420B. For example, as shown in FIG. 4, the model application module 330 determines text features representing a difference between forward plane features 420A and backward plane features 420B. Specifically, a text feature represents a difference between a forward plane feature 420A and a corresponding backward plane feature 420B. In one embodiment, a text feature can be a sum of the squared differences between a forward plane feature 420A and a corresponding backward plane feature 420B.

In various embodiments, a text feature represents a measure of alignment between a prediction of the forward model 410 and a prediction of the backward model 415. A text feature represents an accuracy of the forward model and backward model for modeling neurobiological activity at a cortical surface of the individual. In other words, a text feature is a measure of how well the forward model 410 and the backward model 415 each model the neurobiological activity in the individual at the cortical surface.

Therefore, a text feature can be informative for predicting text that is related to the neurobiological activity. Generally, a high measure of alignment (e.g., small difference) indicates that both the forward propagation of a signal modeled by the forward model 410 and the inverse of the propagation of a signal modeled by the backward model 415 appropriately model the underlying neurobiological activity. Conversely, a low measure of alignment (e.g., large difference) indicates the presence of underlying neurobiological activity that are not modeled by one or both of the forward model 410 and backward model 415.

The model application module 330 applies text features as input to the text model 450. The text model 450 outputs predicted text 470, which can be used by the BCI system 100 to enable unspoken communications on behalf of the individual 110.

In some embodiments, the model application module 330 may perform the flow process 400 multiple times across multiple sets of neuroimaging signals obtained from an individual. For example, for a set of neuroimaging signals, the $E_{in}$ characteristics 425 and $E_{out}$ characteristics 435 derived from the signals in the set may correspond to a particular interval (e.g., a time interval or a frequency interval). Therefore, the predicted text 470 outputted by the text model 450 can correspond to a particular interval. For example, the predicted text 470 can be a word thought by an individual at the particular interval. Therefore, to construct a full sentence, the model application module 330 may perform the flow process 400 multiple times across sequential sets of neuroimaging signals. In various embodiments, the model application module 330 may consider the sequential order of predicted text 470 obtained after performing the flow process 400 multiple times to determine a predicted sentence.

Structure of Predictive Models

The models applied by the model application module 330, including the forward model 410, backward model 415, and text model 450, can each be a machine learning model. In various embodiments, each of the models applied by the model application module 330 is a convolutional neural network. In some embodiments, each of the models applied by the model application module 330 can be one of a neural network, decision tree, an ensemble model (e.g., bagging, boosting, random forest), linear regression, Naïve Bayes, support vector, or logistic regression. Each model includes learned parameters, such as learned biases and learned weights, which are adjusted during training.

In some embodiments, each of the forward model 410, backward model 415, and text model 450 can be the same type of machine learning model. In particular embodiments, each of the forward model 410, backward model 415, and text model 450 can be a convolutional neural network. In some embodiments, two of the forward model 410, backward model 415, and text model 450 may be a first type of machine learning model whereas the third model is a different type of machine learning model. For example, each of the forward model 410 and backward model 415 can be a convolutional neural network whereas the text model 450 can be a different machine learning model.

Figure 5A:
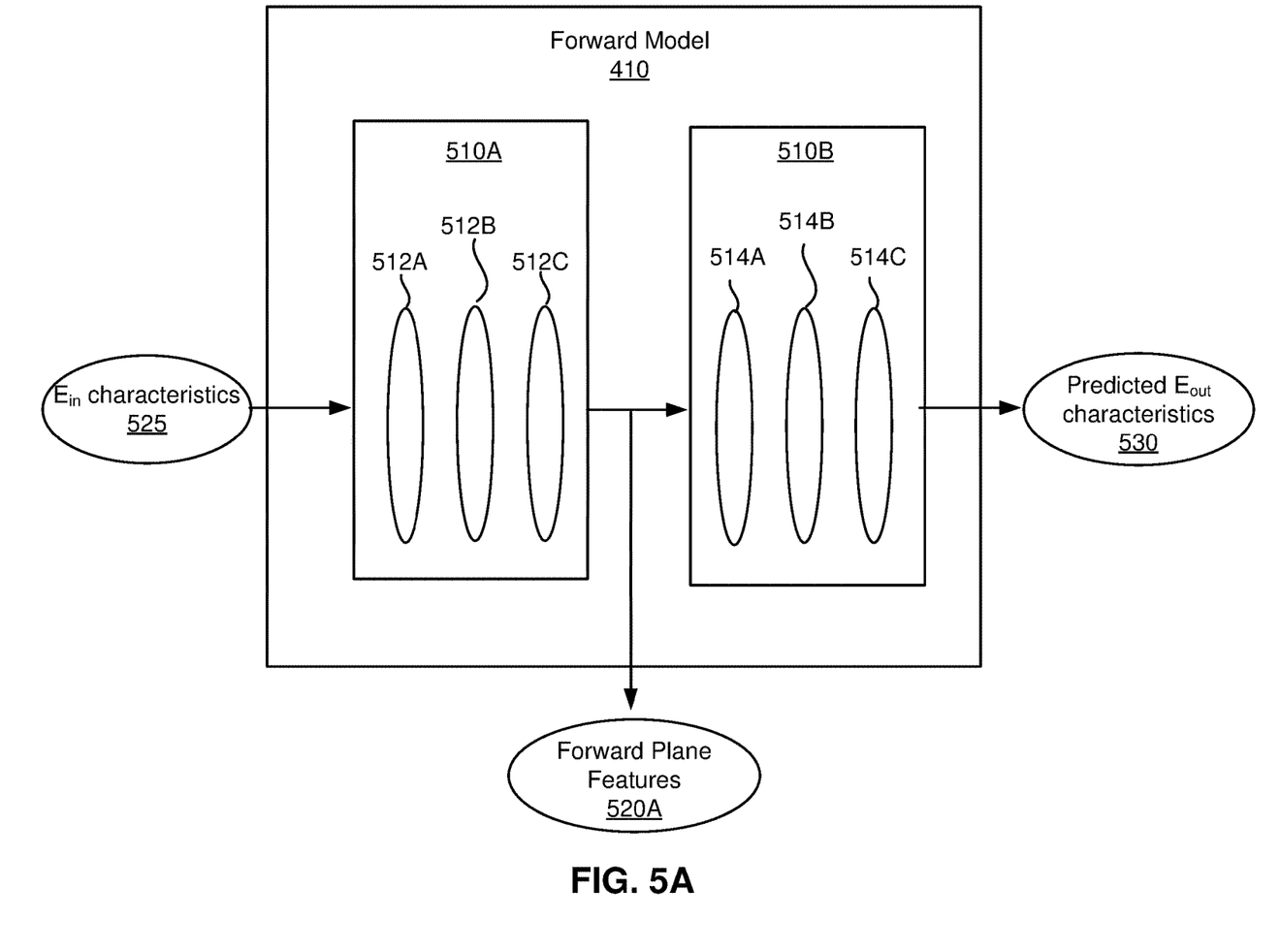
FIG. 5A depicts an example forward model, in accordance with an embodiment.

Referring specifically to the forward model 410, FIG. 5A depicts the structure of an example forward model 410, in accordance with an embodiment. In various embodiments, the forward model 410 is structured to model the forward propagation of light as it is projected from a source (e.g., source 122 in FIG. 2) and subsequently captured by a detector (e.g., detector 124 in FIG. 2). In various embodiments, the forward propagation of a signal through a portion of the individual's head includes the plane of the individual's brain.

As shown in FIG. 5A, the forward model 410 can include a first portion 510A and a second portion 510B. In the embodiment where the forward model 410 is a neural network, the first portion 510A represents a first set of one or more neural layers 512 whereas the second portion 510B represents a second set of one or more neural layers 514. Generally, the first portion 510A receives $E_{in}$ characteristics 525 as input and outputs forward plane features 520A. The second portion 510B receives forward plane features 520A as input and outputs predicted $E_{out}$ characteristics 530.

The first set of neural layers of the first portion 510A of the forward model 410 includes an input layer 512A, an output layer 512C, and one or more intermediate layers 512B. Generally, the first portion 510A of the forward model 410 model the forward propagation of signals as they propagate from sources through an individual's head to the plane. Therefore, the input layer 512A can include nodes that represent the $E_{in}$ characteristics 525 and the output layer 512C can include nodes that represent features of the plane (e.g., forward plane features 520A). The second set of neural layers of the second portion 510B of the forward model 410 includes an input layer 514A, an output layer 514C, and one or more intermediate layers 514B. The second portion 510B of the forward model 410 model the forward propagation of signals as they propagate from the plane to a detector (e.g., detector 124 in FIG. 2). Therefore, the input layer 514A can include nodes that represent the forward plane features 520A and the output layer 514C can include nodes that represent the predicted $E_{out}$ characteristics 530.

In various embodiments, the first set of neural layers 512 may share at least one common layer with the second set of neural layers 514. For example, the output layer 512C of the first set of neural layers 512 and the input layer 514A of the second set of neural layers 514 may be a common neural layer.

Figure 5B:
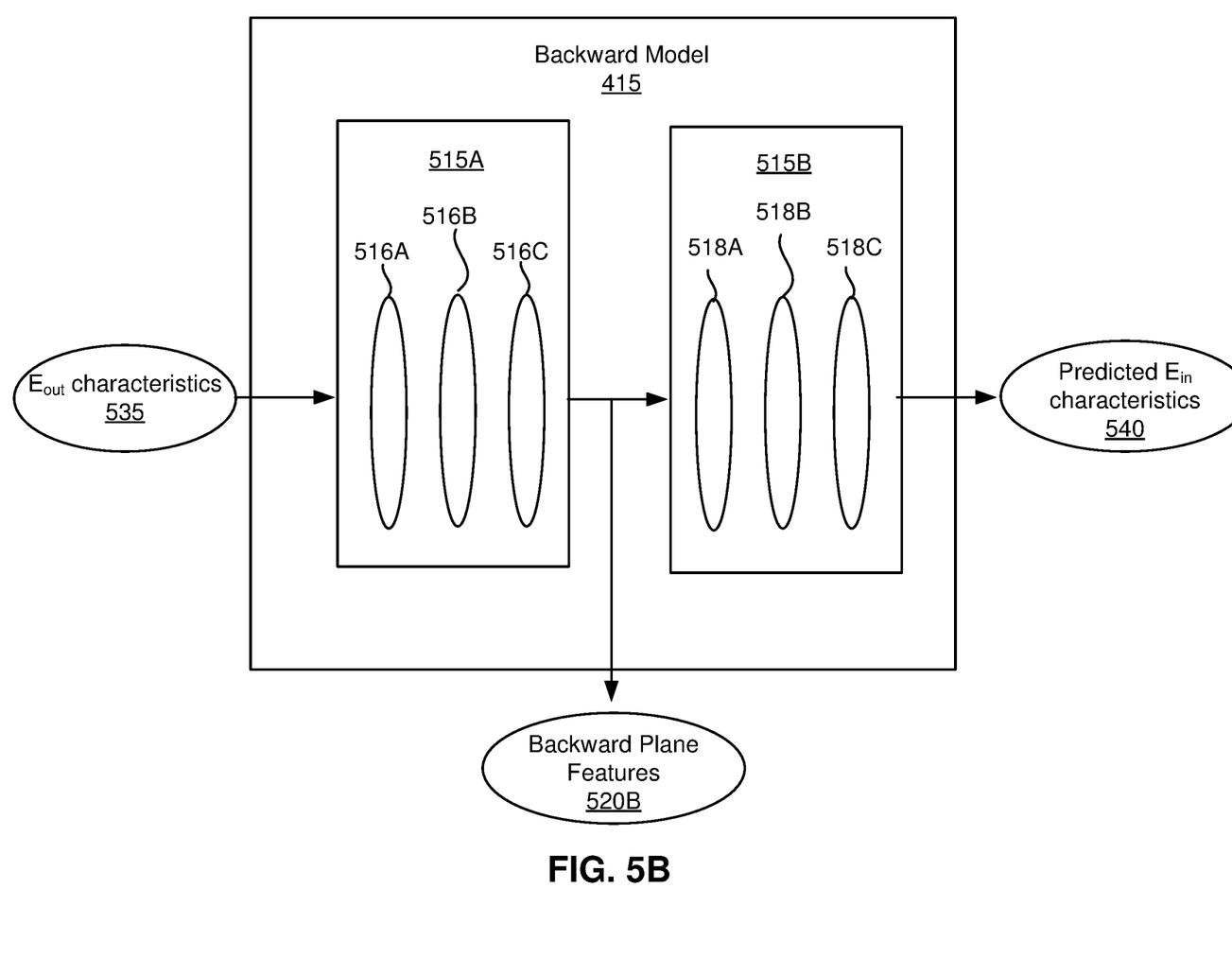
FIG. 5B depicts an example backward model, in accordance with an embodiment.

Referring next to the backward model 415, FIG. 5B depicts the structure of an example backward model 415, in accordance with an embodiment. In various embodiments, the backward model 415 is structured to model the backward propagation of signals through a portion of the individual's head that includes the plane of the individual's brain.

As shown in FIG. 5B, the backward model 415 can include a first portion 515A and a second portion 515B. In the embodiment where the backward model 415 is a neural network, the first portion 515A represents a first set of one or more neural layers 516 whereas the second portion 515B represents a second set of one or more neural layers 518. Generally, the first portion 510A receives $E_{out}$ characteristics 535 and outputs backward plane features 520B. The second portion 515B receives backward plane features 520B and outputs predicted $E_{in}$ characteristics 540.

The first set of neural layers 516 of the first portion 515A of the backward model 415 includes an input layer 516A, an output layer 516C, and one or more intermediate layers 516B. The first set of neural layers 516 of the backward model 415 model the backward propagation of signals as they propagate from the detector (e.g., detector 124 in FIG. 2) through the individual's head to the plane. Therefore, the input layer 516A can include nodes that represent the $E_{out}$ characteristics 535 and the output layer 516C can include nodes that represent features of the plane (e.g., backward plane features 520B). The second set of neural layers 518 of the second portion 515B of the backward model 415 includes an input layer 518A, an output layer 518C, and one or more intermediate layers 518B. The second set of neural layers 518 model the backward propagation of signals as they propagates from the plane to sources (e.g., source 122 in FIG. 2). Therefore, the input layer 518A can include nodes that represent the backward plane features 520B and the output layer 518C can include nodes that represent the predicted $E_{in}$ characteristics 540.

In various embodiments, the first set of neural layers 516 of the backward model 415 may share at least one common layer with the second set of neural layers 518 backward model 415. For example, the output layer 516C of the first set of neural layers 516 and the input layer 518A of the second set of neural layers 518 may be a common neural layer.

In various embodiments, the first portion 510A of the forward model 410 is inversely structured in relation to the second portion 515B of the backward model 415. For example, the input layer 512A of the first portion 510A of the forward model 410 includes the same number of nodes as the output layer 518C of the second portion 515B of the backward model 415. As another example, output layer 512C of the first portion 510A of the forward model 410 includes the same number of nodes as the input layer 518A of the second portion 515B of the backward model 415. In various embodiments, the second portion 510B of the forward model 410 is inversely structured in relation to the first portion 515A of the backward model 415. For example, the input layer 514A of the second portion 510B of the forward model 410 includes the same number of nodes as the output layer 516C of the first portion 515A of the backward model 415. As another example, output layer 514C of the second portion 510B of the forward model 410 includes the same number of nodes as the input layer 516A of the first portion 515A of the backward model 415.

Referring next to the text model 450, it receives text features as input and outputs predicted text. In various embodiments, the text model 450 is a neural network and therefore, includes an input layer, one or more intermediate layers, and an output layer. The input layer can include nodes that correspond to the text features whereas the output layer can include nodes that correspond to the predicted text.

In some embodiments, the forward model 410, backward model 415, and text model 450 form a single convolutional neural network. In these embodiments, a neural layer of the forward model 410 can be shared with the text model 450. As an example, referring again to the structure of the forward model 410 shown in FIG. 5A, the output layer 512C of the first portion 510A of the forward model 410 may also serve as the input layer of the text model 450. In some embodiments, a neural layer of the backward model 415 can be shared with the text model 450. As an example, referring again to the structure of the backward model 415 shown in FIG. 5B, the output layer 516C of the first portion 515A of the backward model 415 may also serve as the input layer of the text model 450. In some embodiments, the output layer 512C of the first portion 510A of the forward model 410 and the output layer 516C of the first portion 515A of the backward model 415 each form a part of the input layer of the text model 450.

Training Predictive Models

The model training module 340 performs the process of training the forward model 410, backward model 415, and text model 450. The model training module 340 may train each of the forward model 410, backward model 415, and text model 450 using one of a variety of different machine learning techniques including decision tree learning, association rule learning, artificial neural network learning, deep learning, support vector machines (SVM), cluster analysis, Bayesian algorithms, regression algorithms, instance-based algorithms, and regularization algorithms. In various embodiments, the model training module 340 trains each of the forward model 410, backward model 415, and text model 450 individually from one another. In other embodiments, the model training module 340 jointly trains the forward model 410, backward model 415, and text model 450.

Generally, each of the forward model 410, backward model 415, and text model 450 are trained using one or more backpropagated losses that are derived from the accuracy of a prediction outputted by one of the models. In one embodiment, the model training module 340 trains the forward model 410 using a first backpropagated loss that represents an accuracy of the prediction outputted by the forward model 410. In some embodiments, the model training module 340 trains the backward model 415 using a second backpropagated loss that represents an accuracy of the prediction outputted by the backward model 415. In some embodiments, the model training module 340 trains the text model 450 using a third backpropagated loss that represents an accuracy of the prediction outputted by the text model 450. In various embodiments, the model training module 340 trains both the forward model 410 and the backward model 415 using the third backpropagated loss that represents an accuracy of the prediction outputted by the text model 450. In these embodiments, the model training module 340 jointly trains the forward model 410, the backward model 415, and the text model 450.

Figure 6:
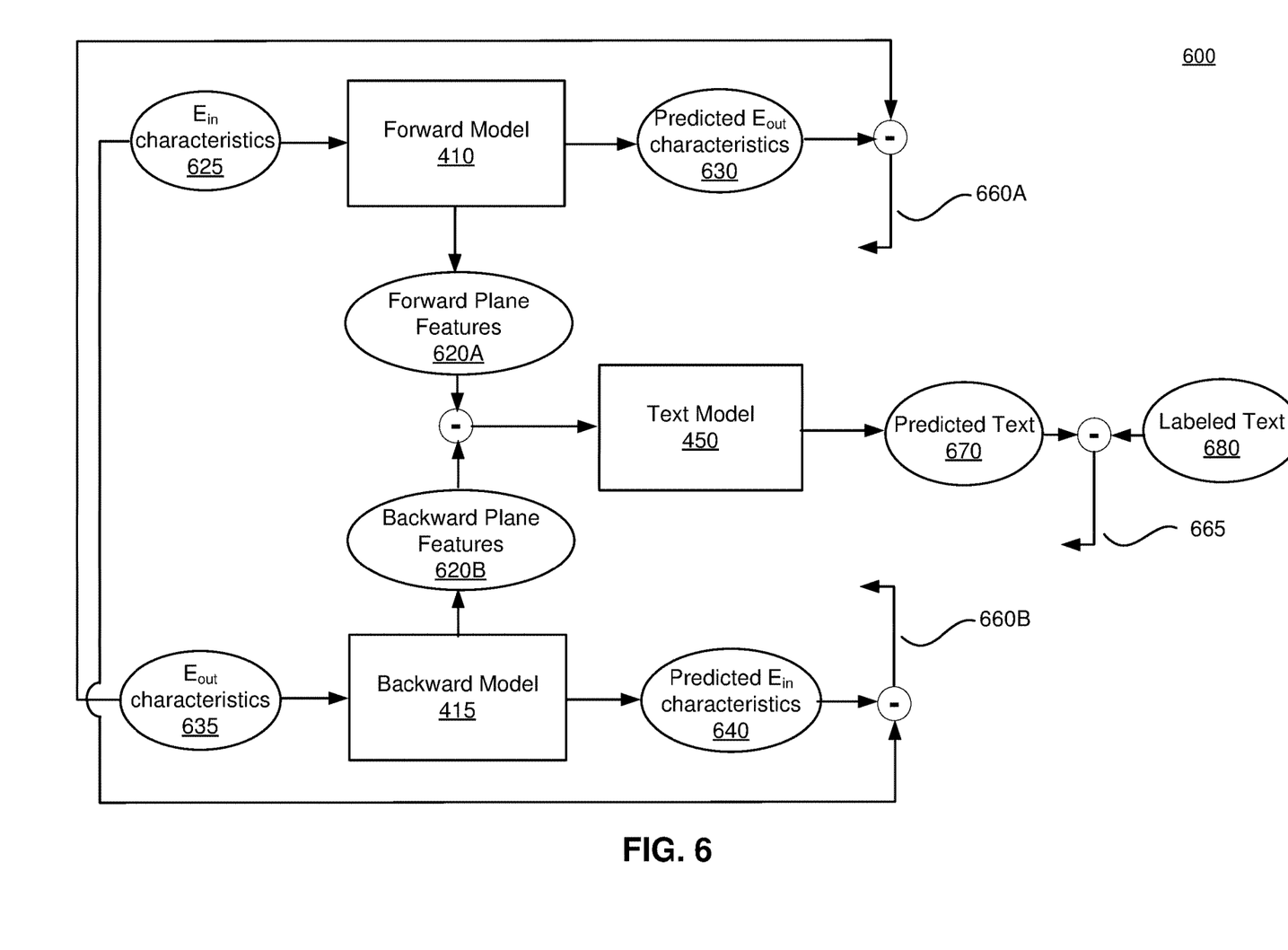
FIG. 6 depicts a block diagram flow process for training the forward model, backward model, and text model, in accordance with an embodiment.

FIG. 6 depicts a block diagram flow process for training a forward model 410, backward model 415, and text model 450, in accordance with an embodiment. The model training module 340 can train each of the forward model 410, backward model 415, and text model 450 using training examples retrieved from the training data store 350. Each training example can include $E_{in}$ characteristics 625, $E_{out}$ characteristics 635, and labeled text 680. Specifically, FIG. 6 depicts one iteration of the training process performed by the model training module 340 using a single training example.

For each training example, the model training module 340 applies the $E_{in}$ characteristics 625 as input to the forward model 410 and applies the $E_{out}$ characteristics 635 as input to the backward model 415. As shown in FIG. 6, the forward model 410 outputs predicted $E_{out}$ characteristics 630 whereas the backward model 415 outputs predicted $E_{in}$ characteristics 640.

The model training module 340 determines a first loss 660A by comparing the predicted $E_{out}$ characteristics 630 to the $E_{out}$ characteristics 635 of the training example. Here, the first loss represents the accuracy of the predicted $E_{out}$ characteristics 630 outputted by the forward model 410. The model training module 340 determines a second loss 660B by comparing the predicted $E_{in}$ characteristics 640 to the $E_{in}$ characteristics 625 of the training example. Here, the second loss represents the accuracy of the predicted $E_{in}$ characteristics 640 outputted by the backward model 415. The model training module 340 backpropagates the first loss 660A and the second loss 660B to train the forward model 410 and the backward model 415, respectively. Therefore, over numerous iterations, the model training module 340 trains the forward model to more accurately predict $E_{out}$ characteristics 630 and the backward model to more accurately predict $E_{in}$ characteristics 640.

As shown in FIG. 6, the forward model 410 further outputs forward plane features 620A and the backward model 415 further outputs backward plane features 620B. The model training module 340 generates text features to be used as input to the text model 450. In some embodiments, text features include the forward plane features 620A and the backward plane features 620B. In some embodiments, the model training module 340 determines text features by determining differences between forward plane features 620A and backward plane features 620B.

The model training module 340 provides the text features as input to the text model 450, which outputs predicted text 670. The model training module 340 determines a third loss 665 by comparing the predicted text 670 to the labeled text 680 of the training example. Here, the third loss represents the accuracy of the predicted text 670 outputted by the text model 450. The model training module 340 backpropagates the third loss 665. Therefore, over numerous iterations, the model training module 340 trains the text model 450 to more accurately output predicted text 670.

The model training module 340 stores each of the forward model 410, backward model 415, and the text model 450. Therefore, each model can be retrieved at a subsequent time (e.g., during deployment). More specifically, the model training module 340 stores the learned parameters of each of the forward model 410, backward model 415, and the text model 450. Therefore, the model training module 340 can retrieve the learned parameters for each respective model during deployment.

Example Process of Enabling Unspoken Communications

Figure 7:
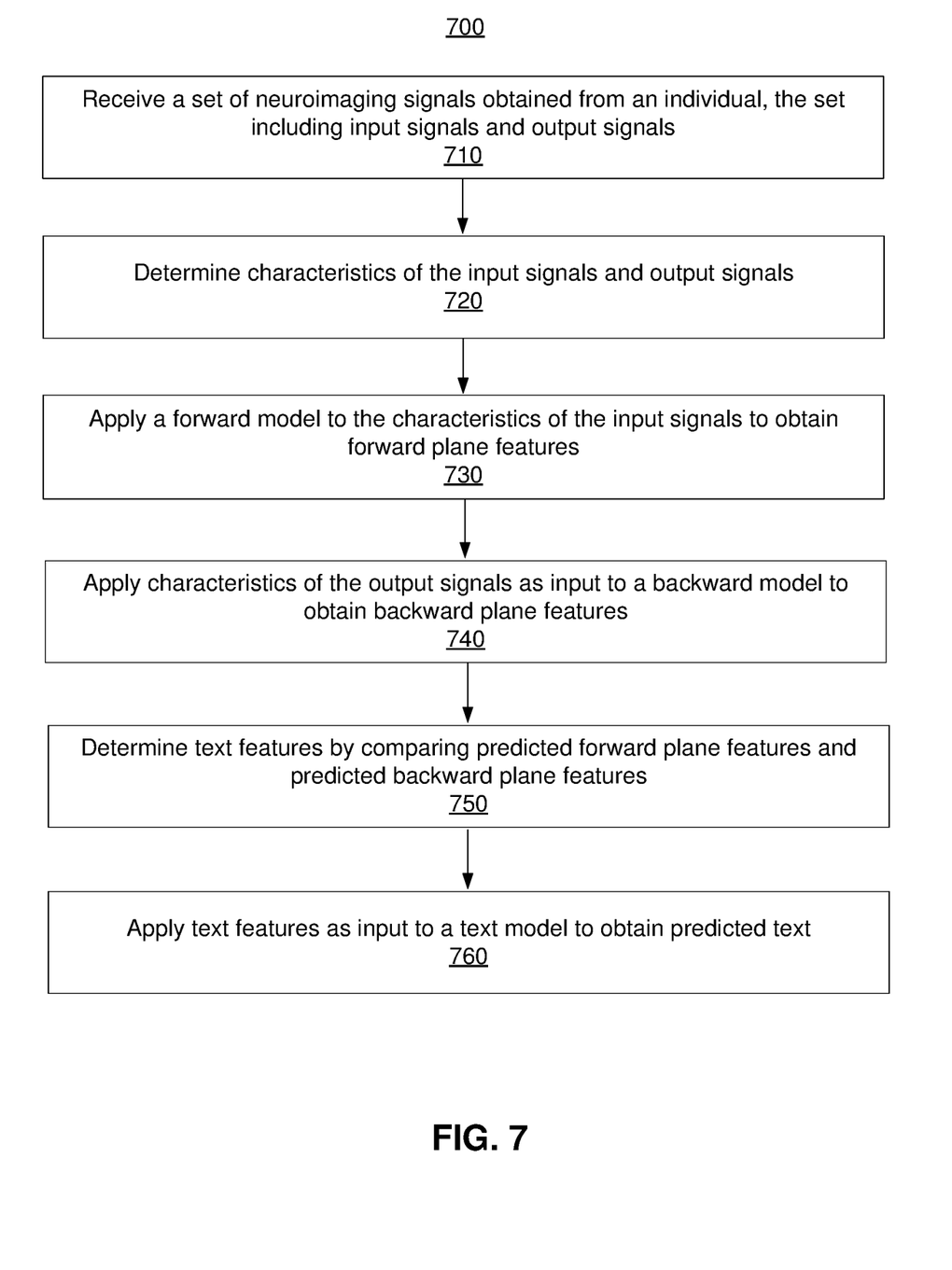
FIG. 7 depicts an example flow process for enabling unspoken communications, in accordance with an embodiment.

FIG. 7 depicts an example flow process 700 for enabling unspoken communications, in accordance with an embodiment. The BCI system 100 receives 710 a set of neuroimaging signals obtained from an individual. In various embodiments, the set of neuroimaging signals includes input illumination signals provided to an individual's head and further includes output signals that have propagated through a portion of the individual's head.

The BCI system 100 determines 720 characteristics of the input illumination signals and the output signals. The BCI system 100 applies 730 characteristics of the input illumination signal as input to a forward model to obtain a forward plane features. Additionally, the BCI system 100 applies 740 characteristics of the output signals as input to a backward model to obtain a backward plane features. The BCI system 100 determines 750 text features by comparing the forward plane features and the backward plane features. As an example, a text feature represents a difference between a forward plane feature and a corresponding backward plane feature. The BCI system 100 applies 760 the text features as input to a text model to obtain predicted text.

Example Computing Device

Figure 8:
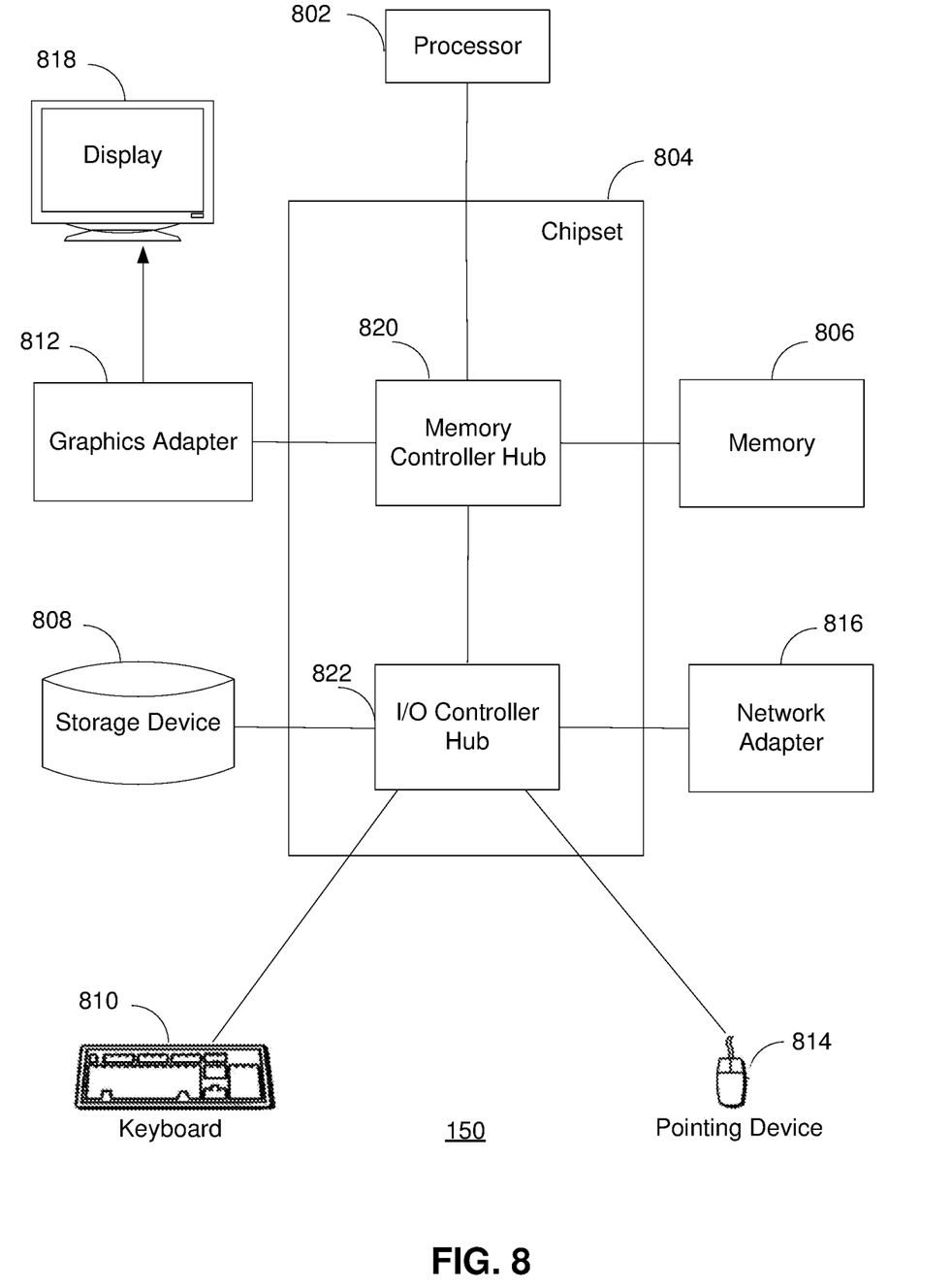
FIG. 8 depicts hardware components of an example computing device, in accordance with an embodiment.

FIG. 8 depicts hardware components of an example computing device 150, in accordance with an embodiment. The example computing device 150 may be implemented in the BCI system 100 as discussed above in relation to FIG. 1. The computing device 150 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, a pointing device 814, and network adapter 816 are coupled to the I/O controller hub 822. Other embodiments of the computing device 150 have different architectures.

The storage device 808 is a non-transitory computer-readable storage medium such as a hard drive, compact disk read-only memory (CD-ROM), DVD, or a solid-state memory device. The memory 806 holds instructions and data used by the processor 802. The pointing device 814 is a touch-screen interface, a mouse, track ball, or other type of pointing device, or some combination thereof, and is used to input data into the computing device 150. The graphics adapter 812 displays images and other information on the display 818. The network adapter 816 couples the computing device 150 to one or more computer networks.

The computing device 150 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 808, loaded into the memory 806, and executed by the processor 802.

The types of computing devices 150 can vary depending upon the embodiment and the processing power required by the entity. For example, the model application module 330 or the model training module 340 can run in a single computing device 150 or multiple computing devices 150 communicating with each other through a network 170 such as in a server farm. In various embodiments, the computing devices 150 lacks some of the components described above, such as graphics adapters 812, and displays 818.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving a set of neuroimaging signals obtained from an individual, the set of neuroimaging signals including input signals and output signals;
determining characteristics of the input signals and the output signals;
applying a forward model to the characteristics of the input signals to predict forward plane features;
applying a backward model to the characteristics of the output signals to predict backward plane features;
determining text features by comparing predicted forward plane features and predicted backward plane features, wherein the text features are derived from a difference of the forward model and the backward model predictions for modeling neurobiological activity at a cortical surface of the individual; and
applying a text model to the text features to obtain predicted text.

2. The method of claim 1, wherein each of the forward model and the backward model are convolutional neural networks.

3. The method of claim 2, wherein the forward model comprises a first set of layers and a second set of layers, wherein the backward model comprises a first set of layers and a second set of layers, wherein the first set of layers of the forward model is inversely structured relative to the second set of layers of the backward model, and wherein the first set of layers of the backward model is inversely structured relative to the second set of layers of the forward model.

4. The method of claim 3, wherein the first set of layers and the second set of layers of the forward model share a common layer, wherein the common layer of the forward model outputs the predicted forward plane.

5. The method of claim 3, wherein the first set of layers and the second set of layers of the backward model share a common layer, wherein the common layer of the backward model outputs the predicted backward plane.

6. The method of claim 1, wherein the forward model is further configured to output characteristics of predicted output signals, and wherein the backward model is further configured to output characteristics of predicted input signals.

7. The method of claim 1, wherein the forward model is trained by:
   obtaining a training example comprising characteristics of training input signals and characteristics of training output signals;
   applying the forward model to characteristics of training input signals to obtain predicted characteristics of training output signals;
   determining a difference between the predicted characteristics of training output signals and the characteristics of training output signals of the training example; and
   backpropagating the difference to train the forward model.

8. The method of claim 1, wherein the backward model is trained by:
   obtaining a training example comprising characteristics of training input signals and characteristics of training output signals;
   applying the backward model to characteristics of training output signals to obtain predicted characteristics of training input signals;
   determining a difference between the predicted characteristics of training input signals and the characteristics of training input signals of the training example; and
   backpropagating the difference to train the backward model.

9. The method of claim 1, wherein the text model is trained by:
   obtaining a training example comprising labeled text;
   applying training text features as input to the text model to obtain predicted training text, the training text features derived from outputs of the forward model and the backward model;
   determining a difference between the predicted training text and the labeled text of the training example; and
   backpropagating the difference to train the text model.

10. The method of claim 1, wherein each of the forward model, backward model, and text model are jointly trained.

11. The method of claim 1, wherein the input signals and the output signals are optical signals.

12. The method of claim 1, wherein characteristics of the input signals and characteristics of the output signals comprise one or more of power of a signal, intensity of a signal, and frequency of a signal.

13. The method of claim 1, wherein forward plane features and backward plane features comprise one or more of an intensity of a signal, an amount of absorption of a signal, an polarization of a signal, an angular momentum of a signal, a motion derived from blood flow, cellular motion, and cellular polarization.

14. A non-transitory computer-readable medium comprising instructions that, when executed by a processor, cause the processor to:
   receive a set of neuroimaging signals obtained from an individual, the set of neuroimaging signals including input signals and output signals;
   determine characteristics of the input signals and the output signals;
   apply a forward model to the characteristics of the input signals to obtain forward plane features;
   apply a backward model to the characteristics of the output signals to obtain backward plane features;
   determine text features by comparing predicted forward plane features and predicted backward plane features, wherein the text features are derived from a difference of the forward model and the backward model predictions for modeling neurobiological activity at a cortical surface of the individual; and
   apply a text model to the text features to obtain predicted text.

15. The non-transitory computer-readable medium of claim 14, wherein each of the forward model and the backward model are convolutional neural networks.

16. The non-transitory computer-readable medium of claim 15, wherein the forward model comprises a first set of layers and a second set of layers, wherein the backward model comprises a first set of layers and a second set of layers, wherein the first set of layers of the forward model is inversely structured relative to the second set of layers of the backward model, and wherein the first set of layers of the backward model is inversely structured relative to the second set of layers of the forward model.

17. The non-transitory computer-readable medium of claim 14, wherein the forward model is trained by:
   obtaining a training example comprising characteristics of training input signals and characteristics of training output signals;
   applying the forward model to characteristics of training input signals to obtain predicted characteristics of training output signals;
   determining a difference between the predicted characteristics of training output signals and the characteristics of training output signals of the training example; and
   backpropagating the difference to train the forward model.

18. The non-transitory computer-readable medium of claim 14, wherein the backward model is trained by:
   obtaining a training example comprising characteristics of training input signals and characteristics of training output signals;
   applying the backward model to characteristics of training output signals to obtain predicted characteristics of training input signals;
   determining a difference between the predicted characteristics of training input signals and the characteristics of training input signals of the training example; and
   backpropagating the difference to train the backward model.

19. The non-transitory computer-readable medium of claim 14, wherein the text model is trained by:
   obtaining a training example comprising labeled text;

applying training text features as input to the text model to obtain predicted training text, the training text features derived from outputs of the forward model and the backward model;

determining a difference between the predicted training text and the labeled text of the training example; and backpropagating the difference to train the text model.

* * * * *